United States Patent
Waxman (10) Patent No.: US 7,548,730 B2
(45) Date of Patent: Jun. 16, 2009

(54) SYSTEMS AND METHODS FOR IMPROVING PERFORMANCE OF MULTIPLE SPATIAL COMMUNICATION CHANNELS

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 11/376,788

(22) Filed: Mar. 16, 2006

(65) Prior Publication Data

US 2007/0217538 A1  Sep. 20, 2007

(51) Int. Cl.
*H04B 1/00* (2006.01)
*H04Q 7/20* (2006.01)

(52) U.S. Cl. ............... 455/69; 455/522; 455/562.1; 342/373; 370/208; 370/334; 370/343

(58) Field of Classification Search ............... 455/69, 455/522, 562.1; 370/208, 319, 334, 343–344; 342/368, 373
See application file for complete search history.

(56) References Cited

U.S. PATENT DOCUMENTS

| 2004/0066761 A1* | 4/2004 | Giannakis et al. | 370/329 |
| 2006/0234751 A1* | 10/2006 | Horng et al. | 455/522 |
| 2007/0140365 A1* | 6/2007 | Horng et al. | 375/260 |

* cited by examiner

*Primary Examiner*—Lee Nguyen
(74) *Attorney, Agent, or Firm*—Schubert Osterrieder & Nickelson PLLC; Jeffrey S. Schubert (57) ABSTRACT

Embodiments include systems and methods for improving performance of multiple spatial communications channels. Embodiments comprise power loading a steering matrix to achieve improved performance.

21 Claims, 10 Drawing Sheets

SYSTEMS AND METHODS FOR IMPROVING PERFORMANCE OF MULTIPLE SPATIAL COMMUNICATION CHANNELS

FIELD

Embodiments are in the field of wireless communications. More particularly, embodiments are in the field of multiple spatial communications channels.

BACKGROUND

A wireless communication system comprises at least one transmitter to transmit information over an RF (Radio Frequency) channel and at least one receiver to receive the information from the RF channel. More particularly, a wireless communication system may comprise two or more communication devices spaced apart, each device having a transceiver comprising a transmitter and a receiver. Typically, at least one device transceiver is able to transmit to and receive from the transceivers of multiple other devices. Some wireless communications systems utilize Digital Beam Forming techniques to steer information into separate spatial channels.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

Embodiments include systems and methods for wireless communication with multiple spatial streams using a power loading matrix. In a Multiple-Input-Multiple-Output (MIMO) wireless system, a power loading matrix post-multiplies a spatial channel steering matrix to reallocate power among the spatial channels created by the steering, resulting in a modified spatial channel steering matrix to steer the multiple spatial channels of the system. The spatial channels resulting from application of the power loading matrix may exhibit a more efficient allocation of power to achieve faster data transfer for a given signal to noise ratio.

Figure 1:
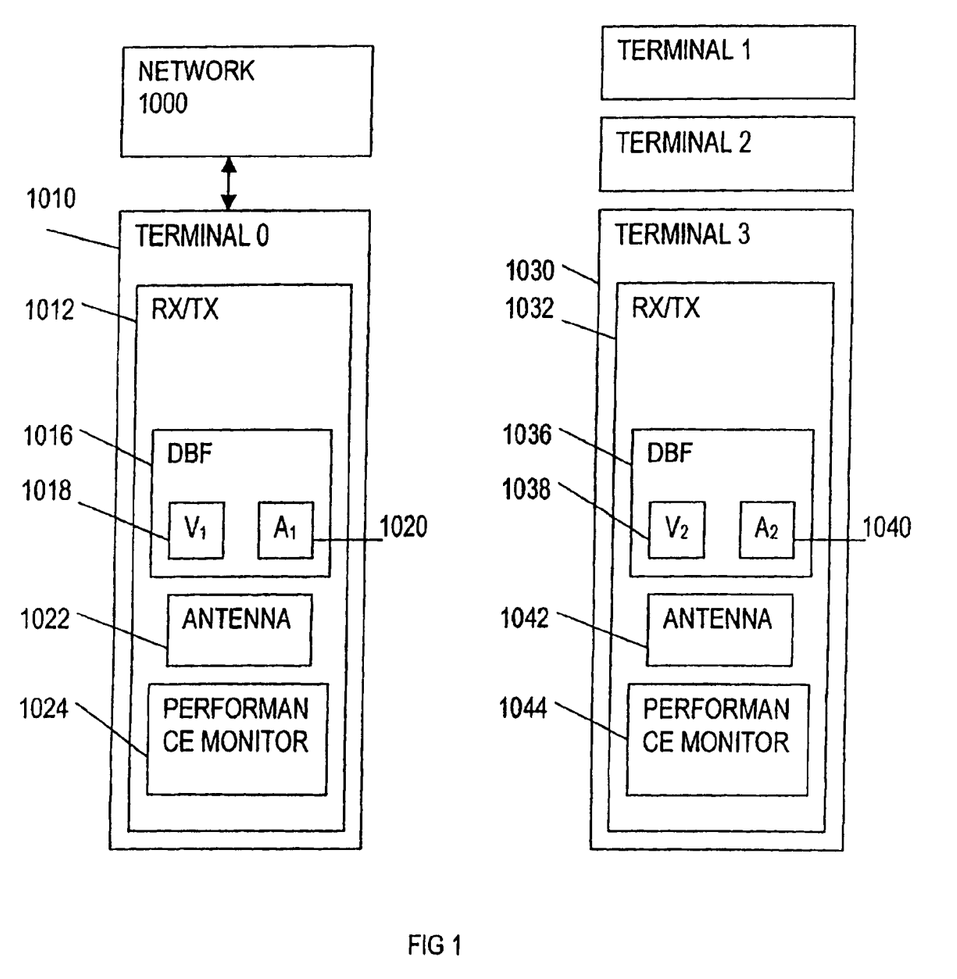
FIG. 1 depicts an embodiment of an example wireless network comprising an access point and multiple fixed or mobile communications devices, the access point and devices comprising power loading matrices to enhance Digital Beam Forming (DBF).

FIG. 1 shows an embodiment of an example wireless network. This configuration comprises a first communications device 1010 that is wire line or wirelessly connected to a network 1000 such as the Internet or a local intranet. Communication device 1010 may communicate wirelessly with a plurality of communication devices 1030. For ease of reference, the communications devices 1010, 1030 are labeled as terminals 0, 1, 2, and 3. A terminal 1030 may be a computer, laptop, notebook, cellular phone, PDA (Portable Digital Assistant), or other wireless-capable device. Thus, a terminal may be mobile or fixed. Terminal 1010 and terminals 1030 each comprise a transceiver (RX/TX) 1012, 1032. Each transceiver comprises an RF transmitter and an RF receiver. Each RF transmitter impresses digital data onto an RF frequency for transmission of the data by electromagnetic radiation. An RF receiver receives electromagnetic energy at an RF frequency and extracts the digital data there from. FIG. 1 may depict a Multiple-Input Multiple-Output (MIMO) system. The wireless communication system of FIG. 1 is intended to represent any of a wide variety of wireless systems which may include without limitation, NFC (Near Field Communications), WLAN (Wireless Local Area Network), WMAN (Wireless Metropolitan Area Network), WiMAX (Worldwide Interoperability for Microwave Access), 2.5-3G cellular, RAN (Radio Access Network), 4G, RFID (Radio Frequency Identification), etc.

In one embodiment, terminal 1010 comprises a Digital Beam Former (DBF) 1016. DBF 1016 transforms information signals into signals to be applied to elements of an antenna array 1022. Antenna array 1022 is an array of individual, separately excitable antenna elements. The signals applied to the elements of antenna array 1022 cause it to radiate a plurality of spatial channels. Each spatial channel so formed may carry information to one or more of terminals 1030.

Accordingly, DBF 1016 comprises a spatial channel steering matrix, $V_1$, 1018 to steer multiple spatial channels. According to one embodiment, steering matrix $V_1$, 1018 may be adaptively determined based upon estimates of the RF channel between transceivers. In addition, an embodiment employs a power loading matrix, $A_1$, 1020 to modify the allocation of power between different spatial channels. A power loading matrix comprises one or more variables that determine the re-allocation of energy between the spatial channels. The one or more variables may be adaptively determined based on a measure of system performance such as throughput or a packet error rate. Thus, transceiver 1012 comprises a performance monitor 1024 to determine a measure of performance.

Similarly, a terminal 1030 comprises a transceiver 1032 to receive and transmit signals from and to access point 1010. Transceiver 1032 may comprise an antenna array 1042 and a DBF 1036 which applies a steering matrix $V_2$, 1038, and a power loading matrix $A_2$ 1040. Power loading matrix, $A_2$, 1040 modifies the allocation of power between different spatial channels transmitted by transceiver 1032. According to one embodiment, the allocation may be based on a packet error rate or throughput. Thus, transceiver 1032 comprises a performance monitor 1044 to detect a measure of performance.

Embodiments therefore apply a power loading matrix, A, to reallocate power among spatial channels formed by a Digital Beam Former. Thus, a plurality of information signals y can be transformed into a plurality of antenna signals x by applying a power loading matrix A and a spatial channel steering matrix V to a vector of the information signals y such that:

$$x = V_{new} y = VAy$$

where $V_{new}$ is the matrix applied to the information signals, y. The power loading matrix A can be employed to reallocate energy from a first spatial channel associated with a highest energy level to a second spatial channel associated with a lowest energy level. Moreover, the power loading matrix A can be adaptively determined based on a measured packet error rate or other measure of performance, such as throughput.

Thus, embodiments comprise a wireless-capable unit with an antenna array comprising elements to receive information-bearing signals from an RF channel. The unit comprises a receiver to receive by the antenna array a steering matrix V from another wireless-capable unit. A performance monitor monitors a measurement of system performance, such as a packet error rate. A power loading matrix calculator determines a power loading matrix A, adaptively, in response to the packet error rate. Processing circuitry post-multiplies V by A and applies the resultant matrix to a vector of information signals, y. The processing circuitry may comprise a microprocessor operating according to computer code. Or the processing circuitry may be hardware dedicated to matrix-vector multiplication.

Figure 2:
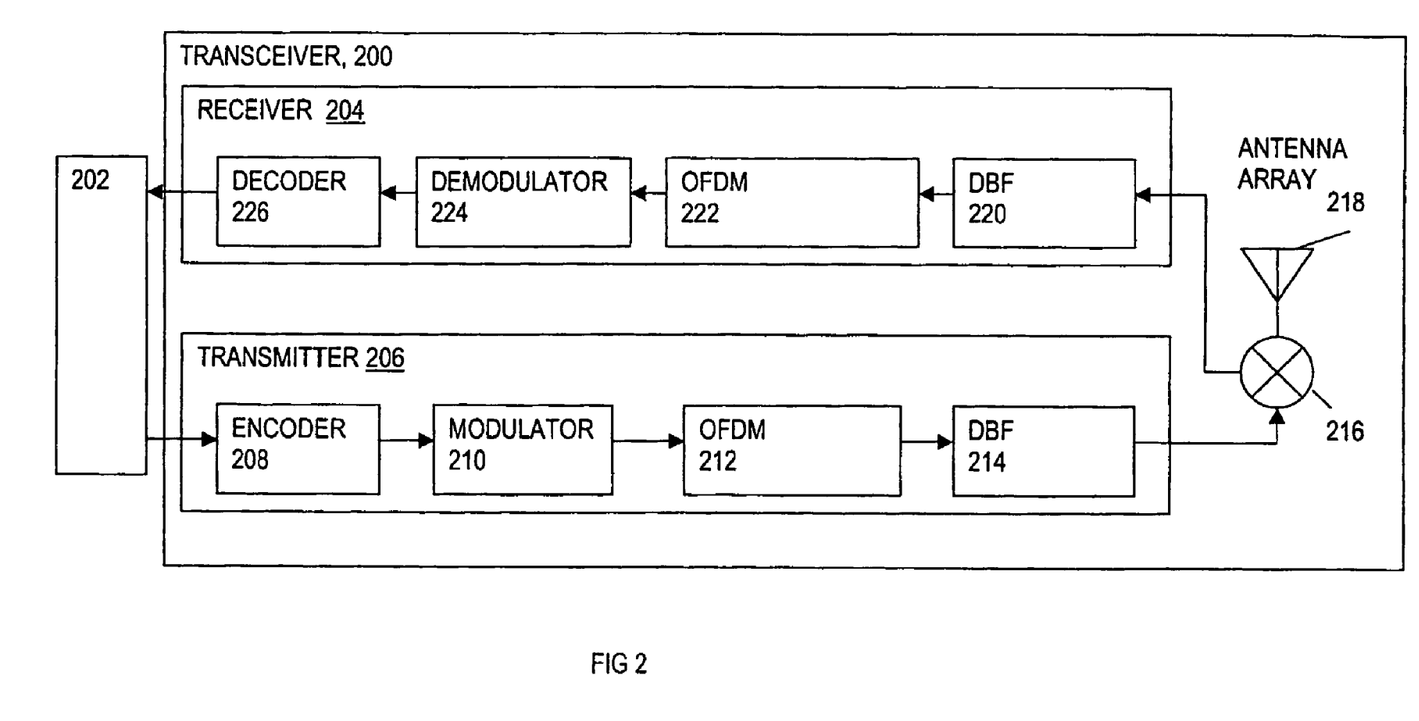
FIG. 2 depicts a general flow of signal processing in a transceiver for Orthogonal Frequency Division Multiplexing (OFDM)-based broadband communication in a wireless network.

FIG. 2 shows a more detailed view of a general flow of example signal processing in a transceiver 200. Transceiver 200 comprises a receiver 204 and a transmitter 206. Transmitter 206 may comprise one or more of an encoder 208, a modulator 210, an OFDM 212, and a DBF 214. Receiver 204 may comprise one or more of a DBF 220, an OFDM 222, a demodulator 224 and a decoder 226. Each of these components of transceiver 200 and their functions will now be described.

Encoder 208 of transmitter 206 receives data destined for transmission from a processor core 202. Processor core 202 may present data to transceiver 200 in blocks such as bytes of data. Encoder 208 encodes the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

One type of encoding is block encoding. In block encoding, the encoder encodes a block of k information bits into corresponding blocks of n code bits, where n is greater than k. Each block of n bits from the encoder constitutes a code word in a set of $N=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon up-conversion and amplification. Modulator 210 impresses the received data blocks onto a sinusoid of a selected frequency. More specifically, modulator 210 maps the data blocks into a corresponding set of discrete amplitudes of the sinusoid, or a set of discrete phases of the sinusoid, or a set of discrete frequency shifts relative to the frequency of the sinusoid. The output of modulator 210 is a band pass signal.

In one embodiment, modulator 210 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos($2\pi ft$) and sin($2\pi ft$).

In another embodiment, modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)/n$ for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t) = \sum_{n=0}^{\infty} \exp(j\pi\Delta f t I_n) g(t - nT)$$

where $I_n$ is an odd integer up to $N-1$ and $\Delta f$ is a unit of frequency shift. Thus, in an FSK signal, each symbol of an information sequence is mapped into one of N frequency shifts.

Persons of skill in the art will recognize that the mathematical equations discussed herein are illustrative, and that different mathematical forms may be used to represent the pertinent signals. Also, other forms of modulation that may be implemented in modulator 210 are known in the art.

The output of modulator 210 may be up-converted to a higher carrying frequency. Or, modulation may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A+B) + \sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

Figure 2A:
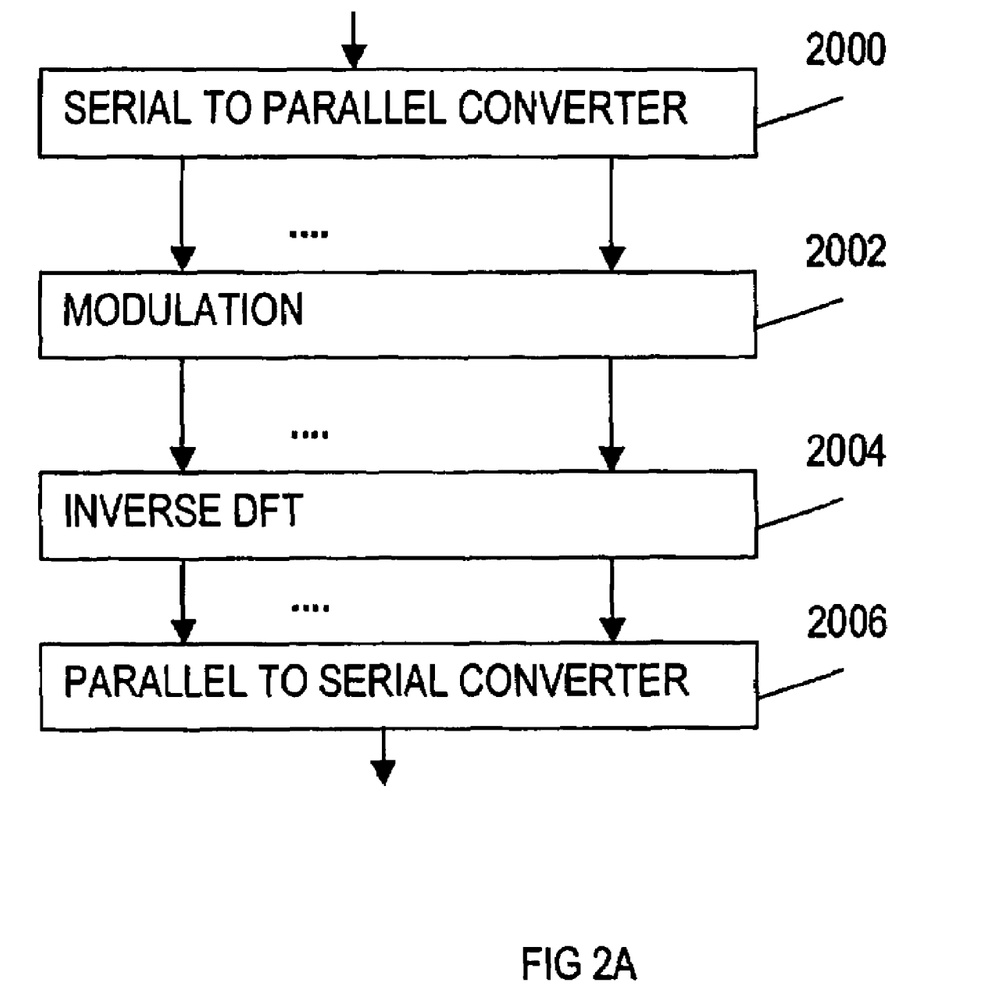
FIG. 2A depicts an embodiment of an example OFDM suitable for use in a transmitter of the transceiver of FIG. 2.

The output of modulator 210 is fed to an Orthogonal Frequency Division Multiplexer (OFDM) 212. OFDM 212 impresses the modulated data from modulator 210 onto a plurality of orthogonal sub-carriers. A block diagram of one embodiment of an OFDM 212 is shown in FIG. 2A. A serial bit stream is converted to blocks of n bits of data in parallel by a serial-to-parallel converter 2000. Optionally, each bit is modulated in parallel by a modulator 2002, instead of, or in addition to the modulation provided by modulator 210. Then, an inverse discrete Fourier transform (DFT), e.g. a Fast Fourier Transform (FFT), is performed on the data by inverse FFT 2004. This impresses the data onto multiple orthogonal sub-carriers. Then, the data may be converted to a serial stream of data of different channels by a parallel to serial converter 2006.

Returning to FIG. 2, the output of OFDM 212 is fed to Digital Beam Former (DBF) 214. Digital beam forming techniques are employed to increase the efficiency and capacity of a wireless system. Generally, digital beam forming uses digital signal processing algorithms that operate on the signals received by, and transmitted from, an array of antenna elements to achieve enhanced system performance. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The problem to be solved by digital beam forming may be stated generally as the problem of separating a set of L information signals, y, that are superimposed and received by an N-element antenna array as a set of N signals, x. Conversely, digital beam forming is employed to solve the problem of combining a set of L information signals, y, to form a set of N signals, x, to be transmitted by the N elements of the antenna array. The desired information signals, y, may be obtained from a matrix multiplication on the received signals, x:

$$y=Ux$$

where U is a matrix determined by computational methods. Similarly, a set of signals, x, to be transmitted by the array may be obtained from a matrix multiplication on the information signals, y:

$$x=Vy$$

where V is also a matrix determined by computational methods. The matrices U and V are chosen to separate out at least one of the information signals of y from a received vector of signals x. Note that the matrices U and V are not inverses of each other since the required beam steering for transmission and reception are generally not the same.

In present embodiments, the spatial channel steering matrix V is modified by applying a power loading matrix A:

$$V_{new}=VA$$

where $V_{new}$ is applied to the information signals y to produce antenna signals x. The operation involving $V_{new}$ to compute x from y may be implemented as shown in FIG. 3A. FIG. 3A shows a multiple beam former 3000 for transmitting L beams from an N-element antenna array. L information signals, $y_1$ through $y_L$, are input in parallel to power dividers 3002. Each power divider 3002 divides the received information signal into N parallel channels. At the output of a power divider, the signal in each of the N channels is multiplied by a different weight, $W^1_n$, each weight being an entry in the matrix $V_{new}$. The resultant products are multiplexed to a plurality of combiners 3004. The output of the combiners (e.g., summers) 3004 are the signals $x_1$ to $x_N$. Each signal $x_n$ is fed to a different one of the N antenna array elements of an antenna array 218.

FIG. 2 also shows diplexers 216 connected to antenna array 218. Thus, in this embodiment, a single antenna array is used for both transmission and reception. When transmitting, the signal passes through diplexers 216 and drives the antenna with the up-converted information-bearing signal, x. During transmission, the diplexers prevent the signals to be transmitted from entering receiver 204. When receiving, information bearing signals received by the antenna array pass through diplexers 216 to deliver the signal from the antenna array to receiver 204. The diplexer then prevents the received signals from entering transmitter 206. Thus, diplexers 216 operate as switches to alternately connect the antenna array elements to the receiver and the transmitter.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. Antennas 218 may be implemented using existing printed circuit board metallization technology. Microstrips, striplines, slotlines, and patches, for example, are all candidates for antennas 218.

FIG. 2 also shows an embodiment of a receiver 204 for receiving, demodulating, and decoding information bearing signals. The received signals are fed from antenna elements 218 to a Digital Beam Former (DBF) 220. DBF 220 transforms N antenna signals into L information signals. FIG. 3B shows a functional diagram of DBF 220, 3010 for determining information signals y from received signals x. The N received signals, x, are each fed to power dividers 3012. The outputs of power dividers 3012 are multiplexed among a set of combiners 3014. Each input to a combiner is multiplied by a weight, $W^1_n$, each weight being an entry in the matrix U, for computation of y=Ux.

Figure 2B:
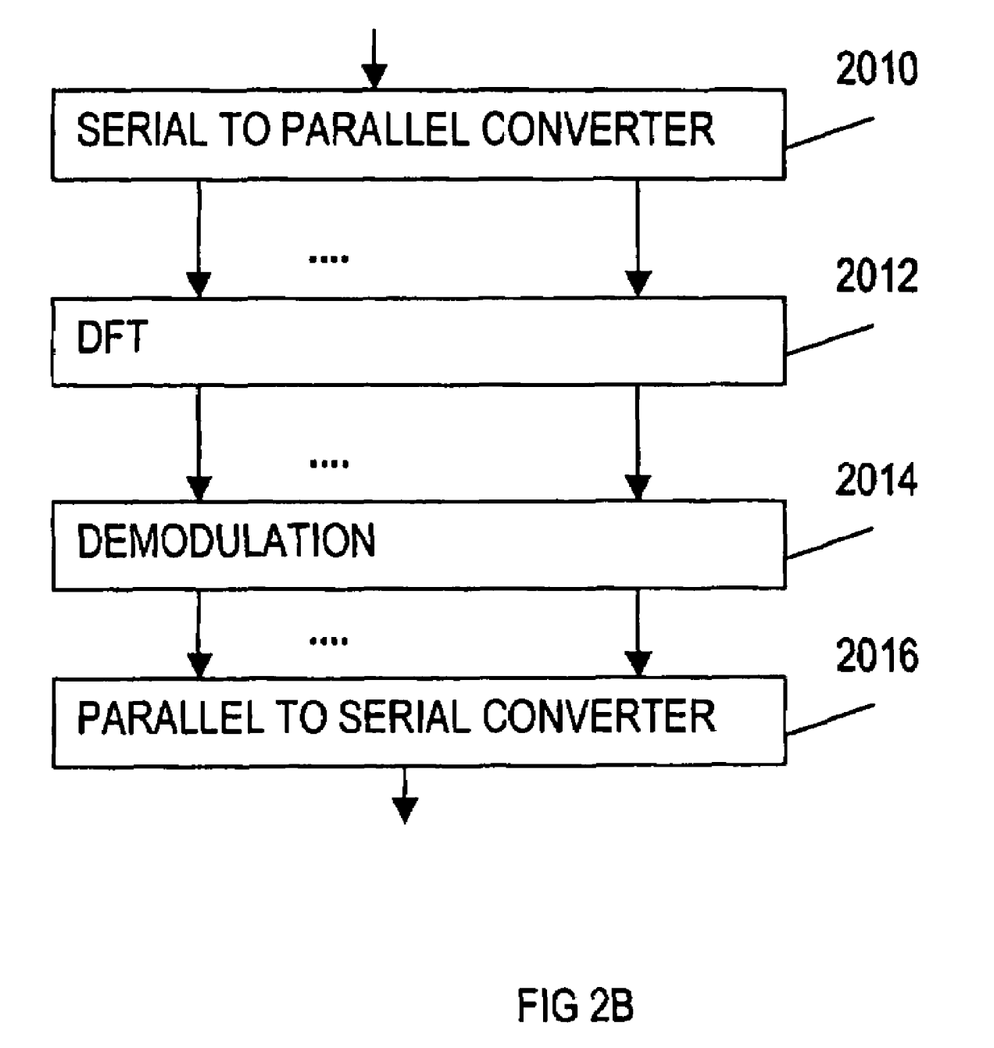
FIG. 2B depicts an embodiment of an example OFDM suitable for use in a receiver of the transceiver of FIG. 2.

The output of DBF 220 is fed to Orthogonal Frequency Division Multiplexer (OFDM) 222. OFDM 222 extracts signal information from the plurality of subcarriers onto which information bearing signals are modulated. FIG. 2B shows a block diagram of OFDM 222. First, a sequential stream of data is converted to parallel 2010. Then, a discrete Fourier transform (DFT) such as, e.g., a Fast Fourier Transform (FFT) 2012 is performed to extract the signal information from the sub-carriers. In one embodiment, demodulation 2014 is performed in parallel on the output data of the FFT. In another embodiment, demodulation is performed separately by a separate demodulator 224. Accordingly, in one embodiment, the OFDM processed signals are converted to a serial data stream and input to demodulator 224.

Demodulator 224 demodulates the received signal. Demodulation is the process of extracting information content from the received signal to produce an un-demodulated information signal. The method of demodulation depends on the method by which the information is modulated onto the received carrier signal. Thus, for example, if the modulation is PSK, demodulation involves phase detection to convert phase information to a binary sequence. Demodulation provides to the decoder a sequence of bits of information. Decoder 226 decodes the received binary data blocks from demodulator 224 and transmits the decoded information to processor core 202.

Persons of skill in the art will recognize that a transceiver will comprise numerous additional functions not shown in FIG. 2. Thus, a transceiver will comprise a Direct Random Access Memory (DRAM), a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. Thus, FIG. 2 shows a general flow of signal processing in a transceiver. Actual implementations may vary. For example, not all embodiments may apply OFDM.

In terms of the operations U and V, the downlink operation V and the uplink operation U may be chosen such that the desired levels of optimality are achieved for both separating the information signals on the uplink and transmitting information signals on the downlink. The operations U and V are functions of the channel characteristics which change with time and frequency. Accordingly, the operations may be computed and performed for each sub-carrier in an OFDM system such as described herein.

Figure 3:
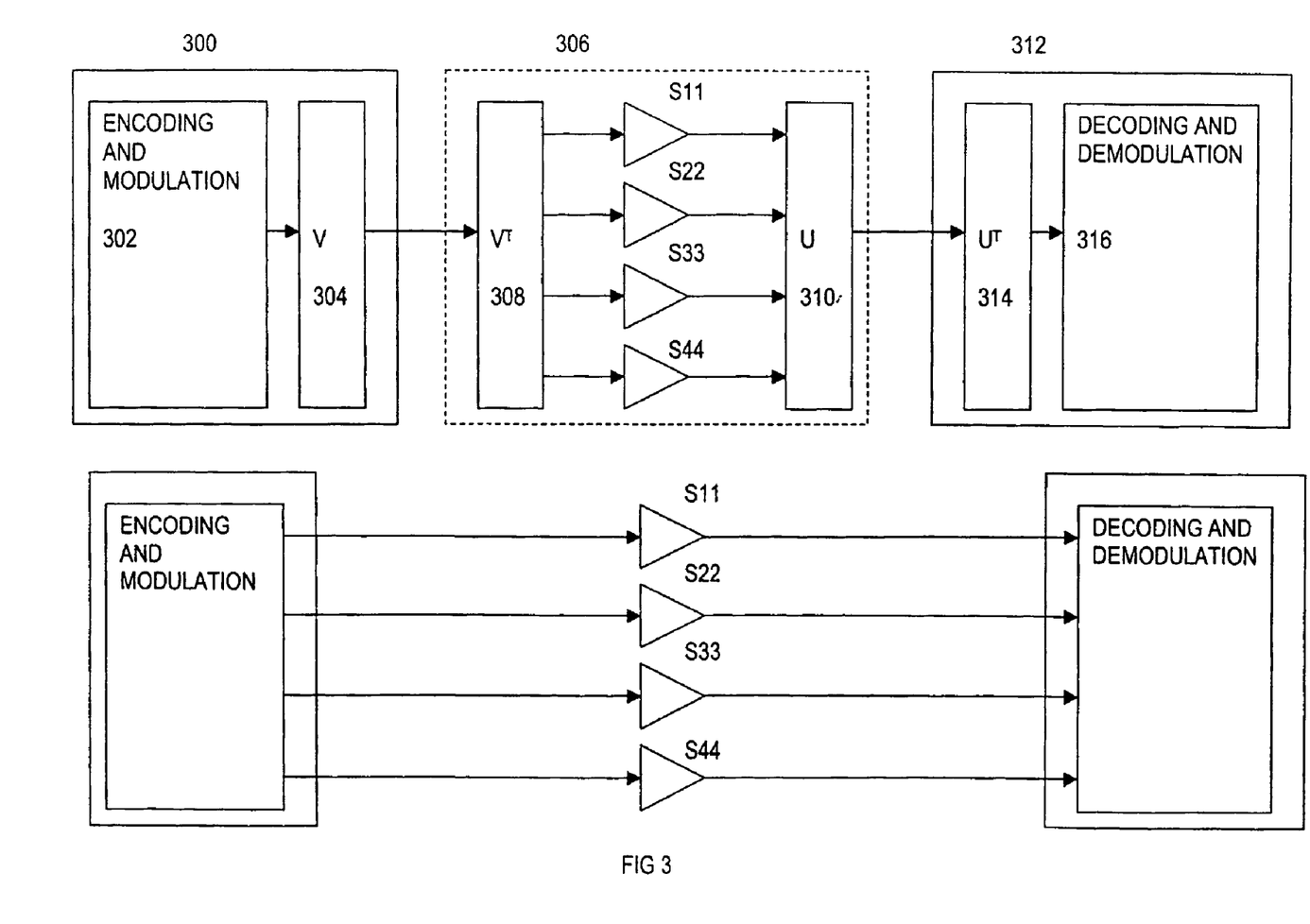
FIG. 3 depicts an example model of a channel in the presence of DBF and the resultant model of substantially independent channels.
Figure 3A:
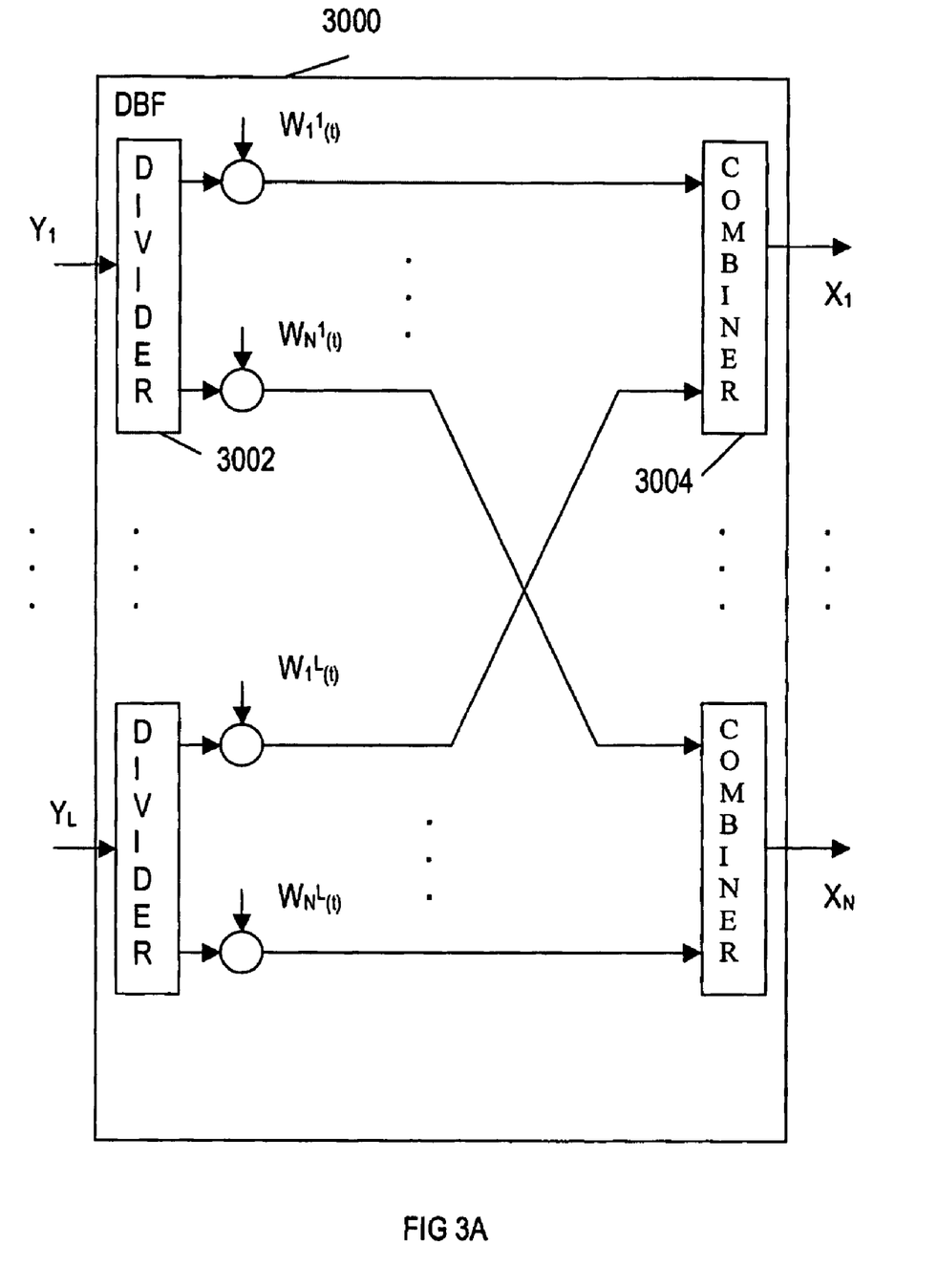
FIG. 3A depicts an example DBF suitable for use in a transmitter of the transceiver of FIG. 2.
Figure 3B:
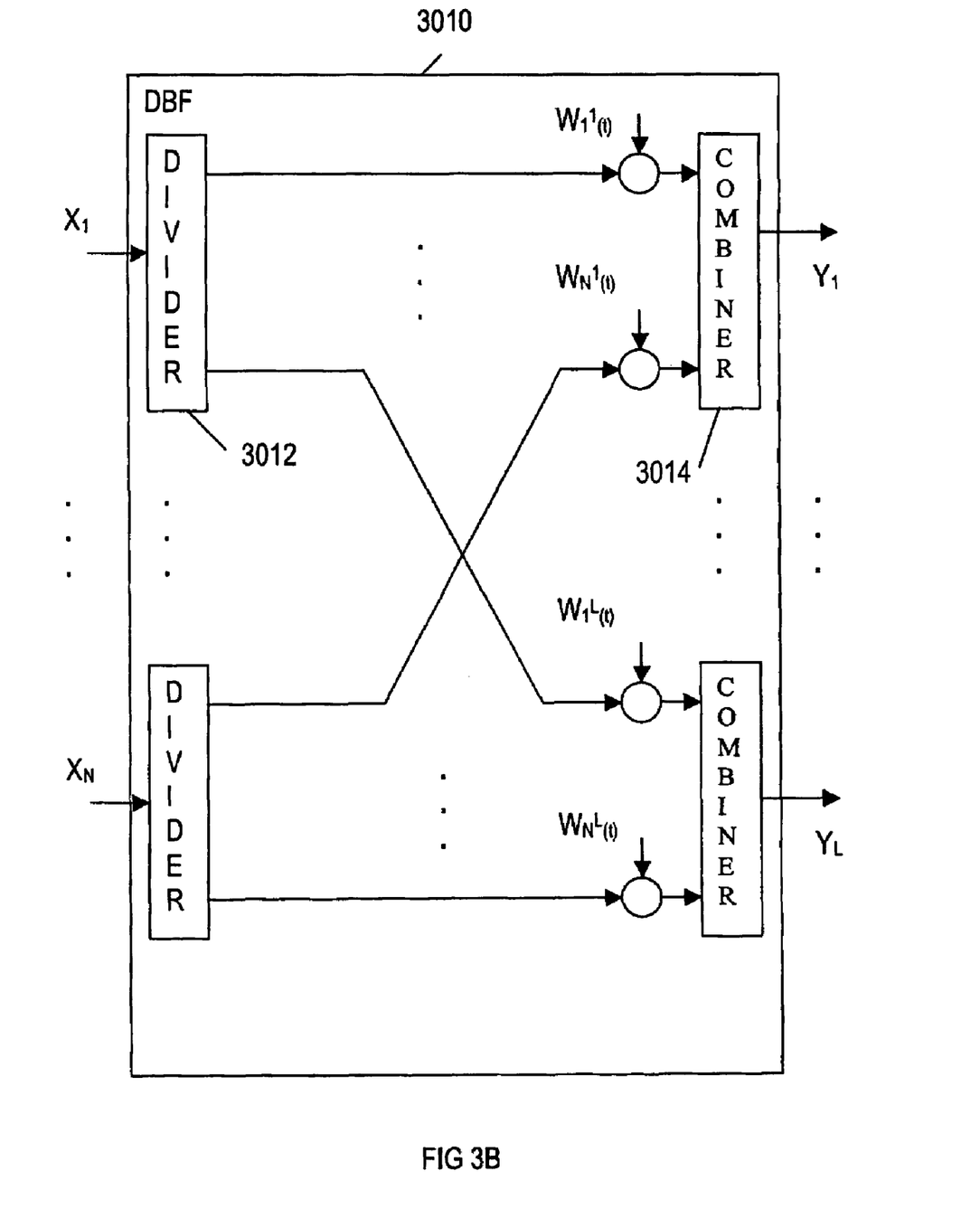
FIG. 3B depicts an example DBF suitable for use in a receiver of the transceiver of FIG. 2.

FIG. 3 depicts the operation of digital beam formers in transmit and receive operations upon the signals transmitted through parallel spatial channels. On the left is a transmitter 300 with encoding and modulation 302, as described above. Transmitter 300 multiplies the information signals to be transmitted by the transmission steering matrix, V 304. On the right is a receiver 312 with decoding and demodulation 316. Receiver 312 multiplies the received signals by reception steering matrix $U^T$ 314. The RF channel 306 between transmitter 300 and receiver 312 is modeled by independent spatial channels S11, S22, S33, and S44. The matrix $V^T$ 308 represents the effects of the channel on the transmitted signal. The matrix U 310 represents the effects of the channel on the received signal. Ideally, multiplication of the transmit and receive signals by V and $U^T$ substantially counteracts the effects of the channel, leaving substantially independent channels S11, S22, S33, and S44. Note, that although 4 spatial channels are shown, other numbers of spatial channels can be formed.

The RF channel 306 has a transfer function:

$$H=USV^T$$

Where U and V are unitary matrices and S is a rectangular matrix whose diagonal elements are real and non-negative and whose off-diagonal elements are zero. If the channel matrix H can be determined, the matrices U and V can be computed using the method of Singular Value Decomposition (SVD). In one embodiment, as packets of data are transmitted, the receiver uses information in the preambles of the packets to estimate the channel matrix, H. The receiver then decomposes the H matrix to determine V. The elements of V are then transmitted back to the transmitter to perform transmit beam steering.

The $m_{th}$ subcarrier signal $X^m$ transmitted by antenna element i upon applying a power loaded transmission steering matrix V is:

$$X_i^m = \sum_{l=1}^{L} V_{i,l}^m Y_l^m$$

where l is the spatial stream index and the elements $V_{i,l}$ are the elements of V. Since, ideally, the spatial streams are independent, the energy radiated in the $m_{th}$ subcarrier signal from antenna element i is:

$$\sigma_y^2 \sum_{l=1}^{L} (V_{i,l}^m)^2 = \sigma_y^2 = \text{constant}$$

where $\sigma_y^2$ is the variance of y.

By decomposing the channel matrix, H, one may determine the eigen-values of the channel. Each spatial channel is associated with its eigen-value. These eigen-values may be ranked from highest to lowest. Each eigen-value is indicative of the relative energy in the corresponding spatial channel. The highest eigen-value corresponds to the spatial channel with the highest energy and the lowest eigen-value corresponds to the spatial channel with the lowest energy. For a spatial channel with a low eigen-value, the order of modulation must be correspondingly low to maintain an acceptable signal-to-noise ratio (SNR). For a spatial channel with a high eigen-value, the order of modulation can be high. In some wireless communications systems, there is a limit on the top modulation rate that may be employed. For Wireless LAN, for example, the order of modulation cannot exceed 64-bit Quadrature Amplitude Modulation (QAM-64) according to the IEEE standard 802.11. Thus, the lowest eigen-value may dictate use of binary PSK (BPSK). The highest eigen-value may call for the use of the highest modulation rate. Clearly, for equal rate modulation for each spatial channel, the channel with the lowest eigen-value becomes a performance bottleneck.

Figure 4:
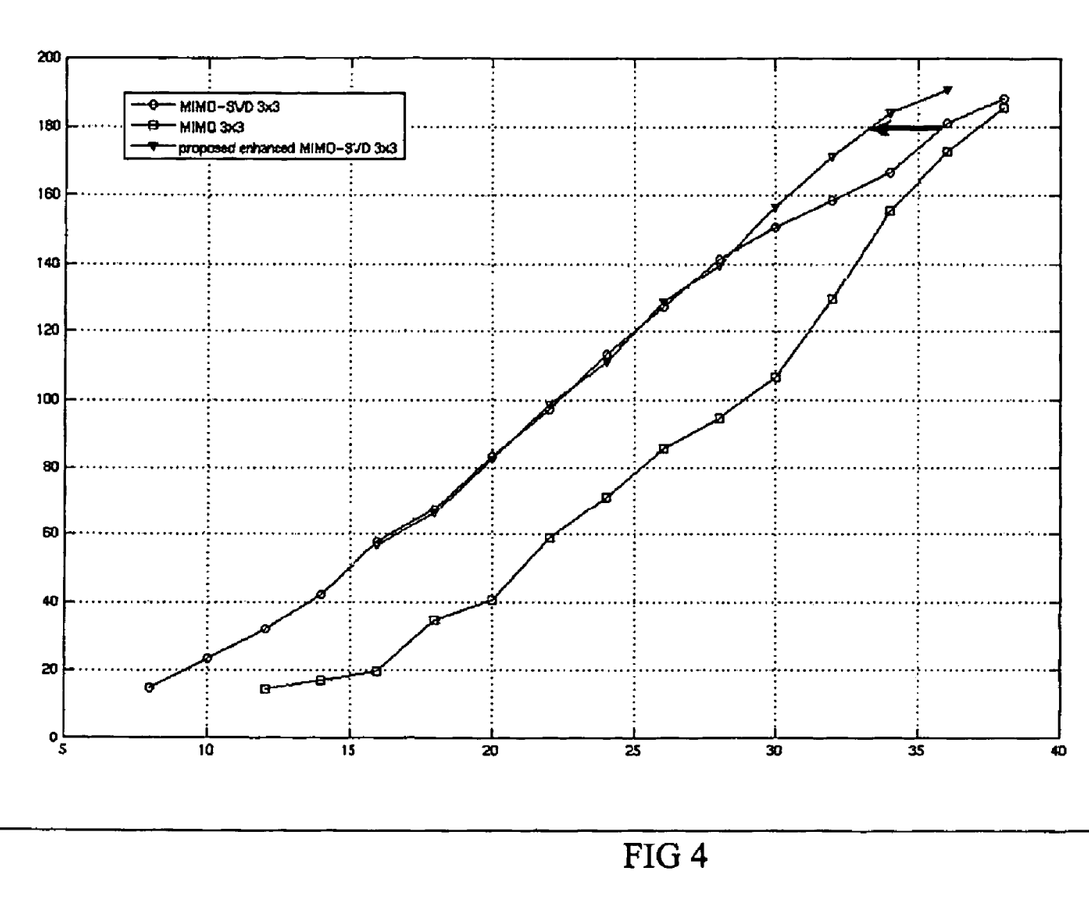
FIG. 4 depicts a graph of performance of three different Multiple-Input-Multiple-Output (MIMO) embodiments, including an embodiment described herein.

FIG. 4 shows a graph of the performance of three MIMO (Multiple-Input-Multiple-Output) systems: MIMO, MIMO-SVD, and power-loaded MIMO-SVD, with QAM 64, and with a coding rate of 5/6. The graph plots throughput versus Signal to Noise Ratio (SNR). MIMO with SVD is clearly superior to MIMO but is not too much better at high SNR. Also, power-loaded MIMO-SVD is superior to MIMO-SVD for high SNR. Note that a relatively weak code rate cannot compensate for the low reliability of the spatial channel with the lowest eigen-value (lowest energy). Therefore, at high SNR, the beam-forming MIMO gain over standard MIMO is relatively low.

Accordingly, embodiments apply a power loading matrix, A, to reallocate power among multiple spatial channels. An exemplary power loading matrix for a 3×3 MIMO-SVD system is:

$$A = \begin{pmatrix} x & 0 & 0 \\ 0 & 1 & 0 \\ 0 & 0 & \sqrt{2-x^2} \end{pmatrix}$$

where x is adaptively determined from measurements of a packet error rate. An exemplary power loading matrix for a 4×4 MIMO-SVD system is:

$$A = \begin{pmatrix} x & 0 & 0 & 0 \\ 0 & 1 & 0 & 0 \\ 0 & 0 & 1 & 0 \\ 0 & 0 & 0 & \sqrt{2-x^2} \end{pmatrix}.$$

An alternative embodiment of A is:

$$A = \begin{pmatrix} x & 0 & 0 & 0 \\ 0 & y & 0 & 0 \\ 0 & 0 & z & 0 \\ 0 & 0 & 0 & \sqrt{4-x^2-y^2-z^2} \end{pmatrix}.$$

Clearly, as the number of parameters of the matrix, A, increases, the complexity of the adaptive system for determining those parameters increases. Moreover, the incremental increase in performance decreases as the number of parameters increases.

The power loading is applied by post-multiplying the spatial channel steering matrix V by the power loading matrix A:

$$V_{new} = VA.$$

Thus, VA becomes the new steering matrix. The matrix A causes a reallocation of power among the spatial channels steered by the transmit steering matrix V. Because the lowest eigen-value is much lower than the highest eigen-value, the parameter x of matrix A can be set initially to some nominal value such as 0.5 or even smaller. Then, during system operation, x is adaptively determined by a performance measurement such as packet error rate or throughput. The transceiver of a transmitter may determine a packet error when a receiver to which the packet was intended fails to send an acknowledgement to the transmitter in response to receipt of the packet. Hence, the number of packet errors as a fraction of a total number of packets sent can be determined. In response to an increase in packet error rate, the system adjusts the parameter x to reduce the packet error rate. Or alternatively, or in addition, the system adjusts the parameter x in response to a change in throughput.

Figure 5:
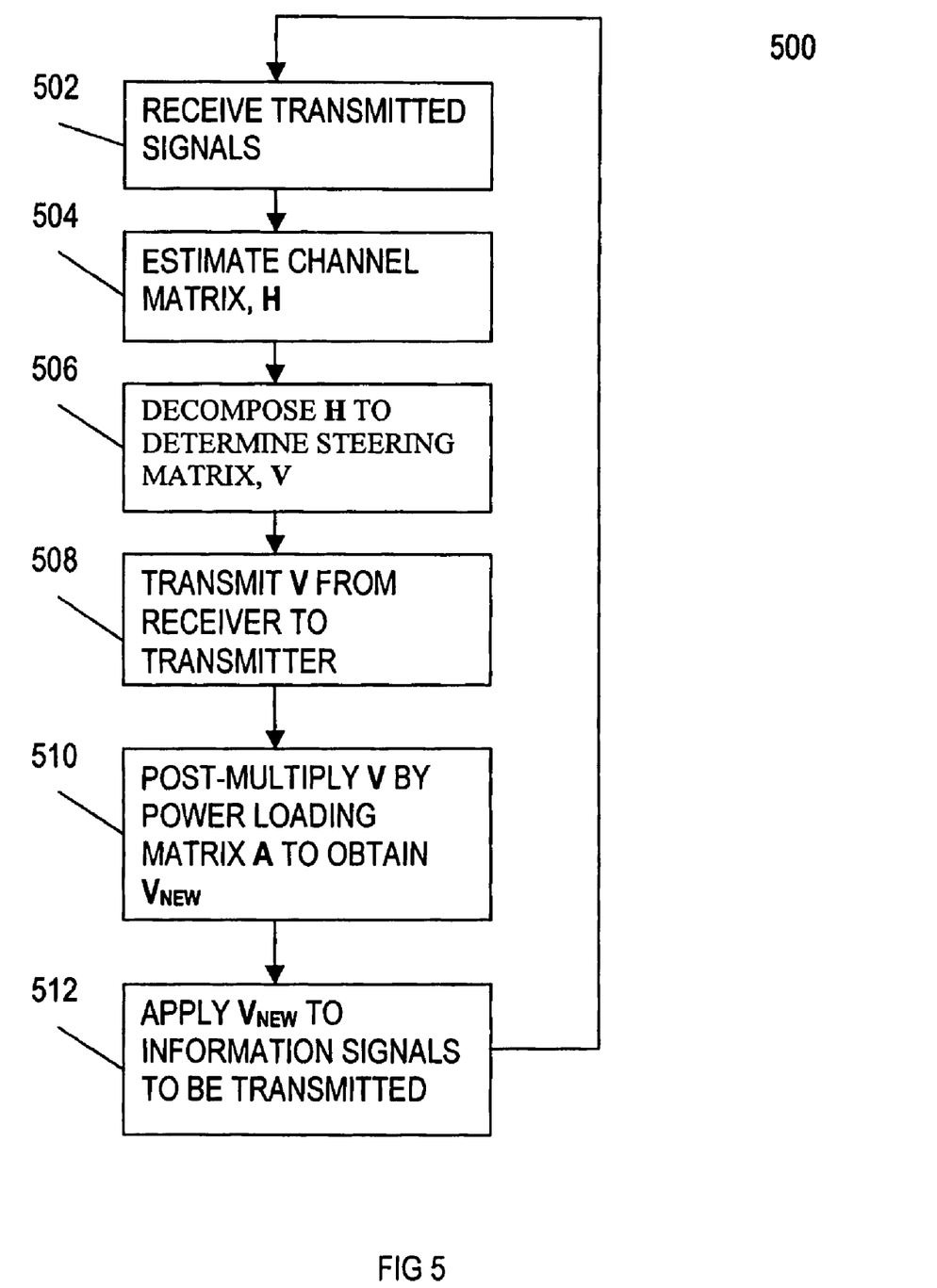
FIG. 5 depicts a flow chart of an example process for adaptively determining a transmit steering matrix.
Figure 6:
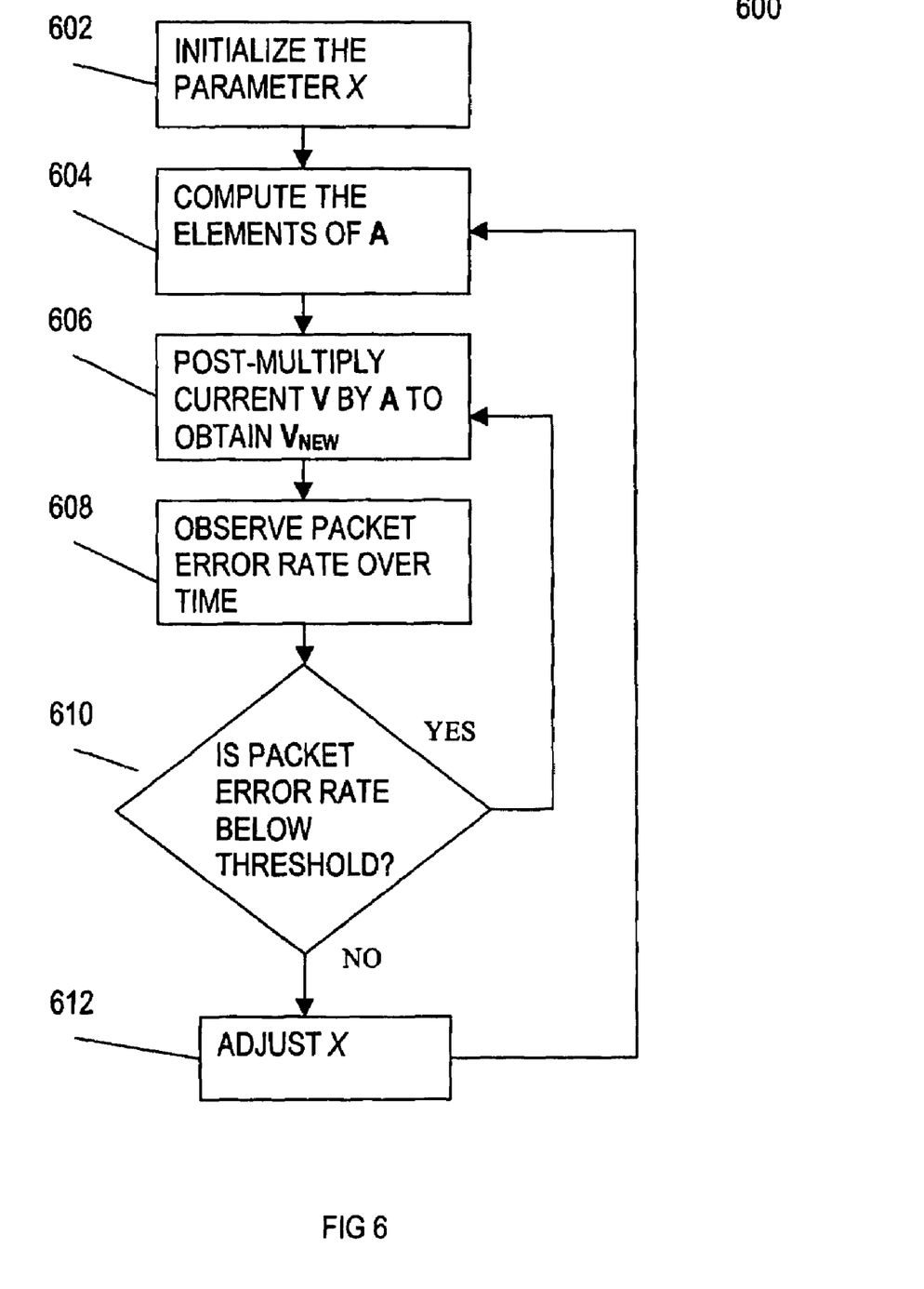
FIG. 6 depicts a flow chart of an example process for adaptively determining a power loading matrix.

FIG. 5 shows a flow chart 500 of an example process for spatial channel steering with power loading. A receiver of a first device receives signals transmitted to it by a transmitter of a second device. For example, in a wireless LAN, an access point transmits signals to the receiver of a computer terminal. The receiver of the computer estimates the channel matrix H (element 504) by, for example, comparing the preambles of the received signals to known preambles. The receiver decomposes the channel matrix H to determine a transmit steering matrix, V (element 506). The receiver transmits the steering matrix V to the access point (element 508). In the transmitter of the access point, V is post-multiplied by a power loading matrix, A, to obtain $V_{new}$ (element 510). The power loading matrix A is adaptively determined in a process as shown in FIG. 6. The processes of FIGS. 5 and 6 may run simultaneously. When $V_{new}$ is obtained, the transmitter applies $V_{new}$ to the information signals to be transmitted (element 512). The process continues, with a new steering matrix V determined periodically. Note that a symmetric process may be implemented to determine a power loaded steering matrix for steering a transmit beam of the computer terminal.

FIG. 6 shows a flow chart 600 of an example process for determining the parameter x of a power loading matrix A. To start, the parameter x is set to some initial value, say 0.5, (element 602). Using this value, the system computes the elements of A (element 604). The system then post-multiplies the current transmit steering matrix V by A (element 606). This corresponds to element 510 of the flow chart of FIG. 5. In the embodiment of FIG. 5, the system observes a packet error rate over time (element 608). In one embodiment, the system determines if the packet error rate rises above a certain threshold (element 610). If not, the process continues (element 606). If so, then the system adjusts the parameter x (element 612). Then, the elements of A are newly computed (element 604) and the process continues. Note that in an alternative embodiment, an algorithm for adjusting x may be implemented that seeks the value of x that yields a minimum packet error rate. Note also that the adaptation rate of the steering matrix V is much faster than the adaptation rate of the power loading matrix A. For example, the steering matrix V might be updated every few milli-seconds, whereas the power loading matrix A might be updated every few seconds.

Thus, embodiments provide a method for spatial channel steering in a wireless system. In one embodiment, a receiver of a first device estimates a channel matrix from signals received from a second device. The first device decomposes the channel matrix to obtain a spatial channel steering matrix. The spatial channel steering matrix is transmitted to the second device. Within the second device, the spatial channel steering matrix is modified by a power loading matrix to produce a resultant matrix. The resultant matrix is applied to information signals to produce substantially independent spatial channels. The power loading matrix reallocates energy among the spatial channels created by the beam steering matrix. The second device also monitors a performance measurement and may responsively adjust the power loading matrix to achieve an improved performance.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for spatial channel steering in a wireless network, comprising:
    obtaining a steering matrix, wherein obtaining the steering matrix comprises updating the steering matrix at a rate that is substantially greater than a rate at which the power loading matrix is updated;
    modifying the steering matrix by a power loading matrix to produce a power loaded transmit steering matrix; wherein the power loading matrix is determined adaptively based on a measurement of system performance; and
    applying the power loaded transmit steering matrix to information signals to be transmitted.

2. The method of claim 1, further comprising modulating the information signals to be transmitted from the second device onto orthogonal sub-carriers.

3. The method of claim 1, wherein applying the power loaded transmit steering matrix steers a radiated antenna transmit beam into multiple spatial channels.

4. The method of claim 3, wherein each spatial channel is substantially independent of the others.

5. The method of claim 3, wherein the bit rates of transmission on each spatial channel are the same.

6. The method of claim 1, wherein determining the power loading matrix adaptively in response to a measurement of system performance comprises choosing a power loading matrix that minimizes a packet error rate.

7. The method of claim 1, wherein determining the power loading matrix adaptively in response to a measurement of system performance comprises adjusting the power loading matrix to maximize a throughput of the system.

8. A wireless system, comprising:
    a receiver to receive a steering matrix V transmitted by a wireless device; and
    a transmitter to post-multiply V by a power loading matrix, A, and to apply the resultant matrix to information signals to be transmitted; wherein A is determined according to a measurement of performance; wherein the transmitter updates the steering matrix at a rate that is substantially greater than a rate at which the power loading matrix is updated.

9. The system of claim 8, wherein the transmitter modulates the information signals onto orthogonal sub-carriers.

10. The system of claim 8, wherein the applied resultant matrix steers a radiated antenna transmit beam into multiple spatial channels that are substantially independent.

11. The system of claim 10, wherein the bit rates of transmission on each spatial channel are substantially the same.

12. The system of claim 8, wherein the power loading matrix reallocates energy from a first spatial channel associated with a highest eigen-value to a second spatial channel associated with a lowest eigen-value.

13. The system of claim 8, wherein the power loading matrix is chosen that minimizes the average packet error rate.

14. A wireless-capable unit, comprising:
    Direct Random Access Memory (DRAM) connected to a receiver;
    a receiver to receive by an antenna a steering matrix V from another wireless-capable unit;
    a packet error monitor to detect packet errors and to determine a packet error rate;
    a power loading matrix calculator to determine a power loading matrix A, adaptively, in response to the packet error rate; and
    processing circuitry to post-multiply V by A and to apply the resultant matrix to a vector of information signals, y; wherein the processing circuitry updates the steering matrix at a rate that is substantially greater than a rate at which the power loading matrix is updated.

15. The unit of claim 14, further comprising within the receiver a modulator for modulating information onto orthogonal sub-carriers.

16. The unit of claim 14, wherein the circuitry applies the resultant matrix to steer a radiated antenna transmit beam into multiple spatial channels that are substantially independent.

17. The unit of claim 14, wherein the calculated power loading matrix is chosen that substantially minimizes a packet error rate.

18. A machine-accessible medium containing instructions for beam steering, which, when the instructions are executed by a machine, cause said machine to perform operations, comprising:
    receiving a steering matrix V transmitted by a wireless device;
    post-multiplying V by a power loading matrix, A, and applying the resultant matrix to information signals to be transmitted; wherein A is determined according to a measurement of performance; and
    updating the steering matrix at a rate that is substantially greater than a rate at which the power loading matrix is updated.

19. The machine accessible medium of claim 18, wherein the applied resultant matrix steers a radiated antenna transmit beam into multiple spatial channels that are substantially independent.

20. The machine accessible medium claim 18, wherein the power loading matrix reallocates energy from a first spatial channel associated with a highest eigen-value to a second spatial channel associated with a lower eigen-value.

21. The machine accessible medium of claim 18, further comprising choosing a power loading matrix that substantially minimizes a packet error rate.

* * * * *